Patented Oct. 6, 1925.

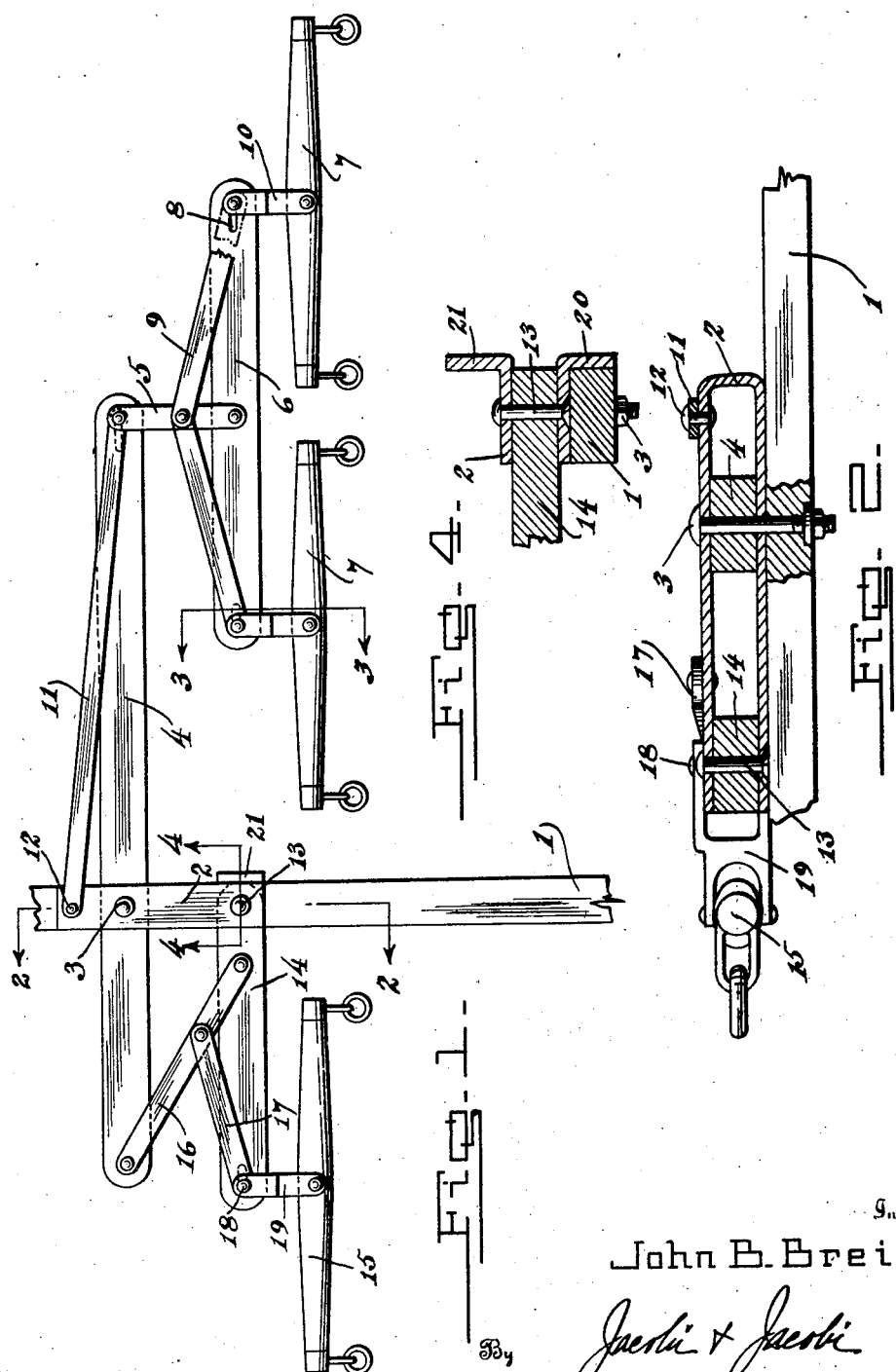

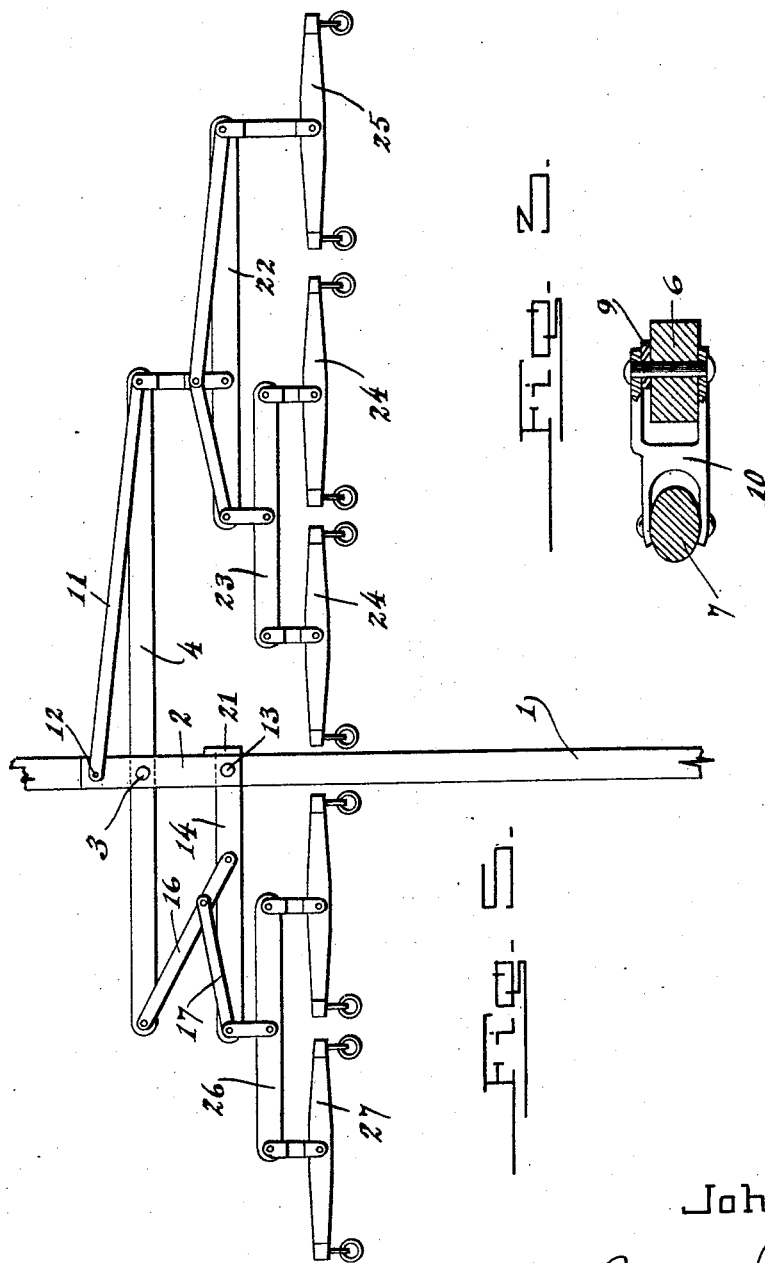

1,556,283

UNITED STATES PATENT OFFICE.

JOHN B. BREI, JR., OF FERRYVILLE, WISCONSIN.

DRAFT EQUALIZER.

Application filed October 4, 1923. Serial No. 666,463.

*To all whom it may concern:*

Be it known that JOHN B. BREI, Jr., a citizen of the United States, residing at Ferryville, in the county of Crawford and State of Wisconsin, has invented certain new and useful Improvements in Draft Equalizers, of which the following is a specification.

This invention relates to a new and useful improvement in draft equalizers and has for its principal object to provide a simple and efficient means for distributing the pull of a number of horses equally between them and preventing the side draft of the wagon pole.

Another important object of the invention is to provide a draft equalizer of the above mentioned character, wherein means is provided for enabling three or five horses to be hitched in such a manner as to divide the work substantially equal between each of the horses.

A still further object of the invention is to provide a draft equalizer of the above mentioned character, wherein means is provided for limiting the movement of the clevis in which the equalizer is mounted in one direction.

A still further object of the invention is to provide a draft equalizer of the above mentioned character, which is simple in construction, inexpensive, strong and durable, and further well adapted for the purposes for which it is designated.

Other objects and advantages of this invention will become apparent during the course of the following description.

In the accompanying drawings forming a part of the specification and in which like numerals designate like parts throughout the same.

Figure 1 is a plan view of my improved draft equalizer.

Figure 2 is a sectional view taken on lines 2—2 of Figure 1 looking in the direction of the arrows.

Figure 3 is a transverse section taken on line 3—3 of Figure 1.

Figure 4 is a similar view taken on line 4—4 of Figure 1.

Figure 5 is a plan view of a modification adapted for hitching up five horses.

In the drawings wherein for the purpose of illustration is shown the preferred embodiment of my invention, the numeral 1 designates the wagon tongue or pole and pivotally mounted thereon adjacent the rear end thereof is the U-shaped clevis 2. The bolt 3 is provided for pivotally supporting the clevis on the wagon pole. Extending transversely through the clevis 2 is the spreader bar 4. The latter is also adapted to be pivotally supported upon the bolt 3 as clearly shown in Figure 2 of the drawings and is so mounted in the clevis as to have the bolt 3 extending adjacent one end of the bar so as to cause one end to extend for a greater distance beyond the clevis and the draft pole in the manner as clearly shown in Figure 1 of the drawings.

Pivotally supported at the outer end of the longer arm of the bar 4 by means of the link 5 is the double tree 6, the latter carrying at its outer end the usual swingle trees 7. As is clearly illustrated in Figure 1 of the drawings the ends of the double tree 6 are provided with the elongated slots 8 for the purpose of permitting the lateral movement of the swingle trees 7 therein and a similar slot is provided in the outer end of the longer arm of the spreader bar 4 for permitting the lateral movement of the link 5 which carries the double trees 6. To provide for the longitudinal movement of each of the swingle trees 7, the straps 9 are connected at their upper ends to the link 5 and at their outer lower ends to the swingle tree connecting means shown at 10 in the drawings.

Extending from the upper end of the link 5 to the upper or rear portion of the clevis 2 is the elongated lever 11, the latter being secured to the upper face of the clevis 2 adjacent the base portion thereof by any suitable fastening means such as is shown at 12 in the drawings. Extending through the free ends of the arms of the U-shaped clevis 2 is the pin 13 and pivotally supported thereon at one end is the arm 14. This arm 14 is adapted to extend laterally from the clevis and the draft pole and is normally parallel with the shorter arm of the spreader bar 4, as clearly shown in Figure 1 of the drawings. The outer end of the arm 14 is provided with an elongated slot and is furthermore adapted to support thereon the swingle tree 15.

Extending between the outer end of the shorter arm of the spreader bar 4 and the arm 14 adjacent the connection 13 thereof is the link 16. A similar link 17 extends from the link 16 to the pin 18 which supports the swingle tree supporting means 19 thereof. The link 17 is so arranged as to have its lower end extending below the swingle tree supporting means 19 and having its upper secured to the upper face of the link 16 as clearly shown in Figure 1 of the drawings.

In this manner it will be seen that with the parts arranged as shown in Figure 1 of the drawings one horse is adapted to be placed on one side of the draft pole 1 and hitched to the swingle tree 15 while two horses are hitched to the swingle trees 7 mounted on the double trees 6 on the opposite side of the draft pole 1. And by the arrangement of the various link connections the pull by each of the horses will be equalized as will obviously appear from the construction shown and described. To further limit the movement of the clevis 2 in one direction whereby the unequal draft by the horses is prevented, I provide the clevis at its outer end with the projections or extensions 20 and 21 respectively. The latter are formed on the same side of the clevis and are provided on each of the arms thereof in the manner as clearly shown in Figure 4 of the drawings and when in use, one of the extensions is adapted to be bent down for engagement with the sides of the draft pole 1 whereby the movement of the clevis upon the pivot 3 is limited in one direction, the arrangement of the extensions being such as to permit the same to be readily reversible so that the limiting of the movement of the clevis in either direction be provided for whenever the double trees and swingle trees are changed about.

In Figure 5 of the drawings a modification is shown wherein the draft equalizer is adapted to be associated with a double tree on one side of the draft pole and a triple tree on the other side of the draft pole. In this construction the outer end of the longer arm of the spreader bar 4 supports the triple tree 22 and the latter in turn has at its outer end connected the double trees 23 to which are connected at its respective ends the swingle trees 24 and at the opposite end of the triple tree 22 is mounted the swingle tree 25. The arm 14 which extends from the opposite side of the draft pole 1 carries at its outer end the double tree 26 and suitable swingle trees 27 are mounted at the outer ends of the double tree as clearly shown in the drawings. The arrangement of the connecting means of the double and triple trees to the clevis 2 and the spreader bar 4 are substantially the same as shown at Figure 1 of the drawings and the operation thereof is also similar to the operation heretofore referred to. In view of this it is not thought necessary to further go into detail as to the operation of the equalizer shown in Figure 5 of drawings as it is thought that the operation and description of the three horse equalizer will suffice therefor.

It will thus be seen from the foregoing description that a draft equalizer has been provided which will equally distribute the pull by the horses connected thereto and wherein means is provided for limiting the movement of the clevis in one direction whereby the proper movement of the several parts will be assured and furthermore cause the equal distribution of the pull without resulting in the side draft of the wagon pole 1. The simplicity of my device furthermore enables the same to be readily disconnected whenever desired and the parts thereof may be readily replaced at a minimum expense.

From the foregoing description of the construction of my improved apparatus, it will be seen that I have provided a simple, inexpensive and efficient means for carrying out the objects of the invention, and while I have particularly described the elements best adapted to perform the functions set forth, it is obvious that various changes in form, proportion, and in the minor details of construction may be resorted to, without departing from the spirit or sacrificing any of the principles of the invention.

Having thus described my invention, what I claim is:

A draft equalizer comprising a draft pole, an elongated U-shaped clevis pivotally supported thereon and normally in longitudinal alignment therewith, a spreader bar pivotally mounted between the arms of said clevis adjacent one end thereof and extending transversely of the pole, the one end of said spreader bar extending to a point a greater distance beyond one side of the pole than the extension of the opposite projecting portion, an arm pivotally mounted between the arms of the other end of said clevis and extending to the side of the pole to which the shorter portion of the spreader bar extends, the normal position of said last mentioned arm being substantially parallel with the adjacent projecting portion of the spreader bar, a link member pivotally connected to the outer end of the shorter projecting portion of said spreader bar and pivoted at its opposite end to said arm adjacent the inner pivoted end of the latter, a second link member pivoted at its one end intermediate the ends of the last mentioned link and pivoted at its opposite end with a loose connection to the outer end of said arm, an elongated lever pivoted at its one end to the rear end of said clevis and loosely pivoted at its opposite end to the outer end of the longer portion of said spreader bar, draft appliances pivotally secured to the outer end of said arm and the outer end of the longer portion of said spreader bar, and an upstanding angular and integral extension formed on the side edge of the forward end of said clevis adapted to engage the side of the draft pole for limiting movement of said clevis in one direction.

In testimony whereof I affix my signature.

JOHN B. BREI, Jr.